(12) United States Patent
Zarubin

(10) Patent No.: US 10,990,707 B1
(45) Date of Patent: Apr. 27, 2021

(54) DEVICE FOR SAFE DATA SIGNING

(71) Applicant: Comodo Security Solutions, Inc., Clifton, NJ (US)

(72) Inventor: Evgeny Zarubin, Odessa (UA)

(*) Notice: Subject to any disclaimer, the term of this patent is extended or adjusted under 35 U.S.C. 154(b) by 278 days.

(21) Appl. No.: 15/940,918

(22) Filed: Mar. 29, 2018

Related U.S. Application Data

(60) Provisional application No. 62/478,659, filed on Mar. 30, 2017.

(51) Int. Cl.
| | |
|---|---|
| *G06F 21/78* | (2013.01) |
| *G06F 21/85* | (2013.01) |
| *G06F 21/60* | (2013.01) |
| *G06F 21/62* | (2013.01) |
| *H04L 9/32* | (2006.01) |
| *G06F 21/10* | (2013.01) |
| *G06F 21/31* | (2013.01) |
| *G06F 12/14* | (2006.01) |
| *G06F 13/40* | (2006.01) |

(52) U.S. Cl.
CPC .......... *G06F 21/78* (2013.01); *G06F 12/1408* (2013.01); *G06F 13/4022* (2013.01); *G06F 21/10* (2013.01); *G06F 21/31* (2013.01); *G06F 21/602* (2013.01); *G06F 21/6209* (2013.01); *G06F 21/85* (2013.01); *H04L 9/3247* (2013.01); *H04L 9/3263* (2013.01); *G06F 13/4063* (2013.01); *G06F 2213/0042* (2013.01)

(58) Field of Classification Search
CPC .. G06F 21/78; G06F 12/1408; G06F 13/4022; G06F 21/10; G06F 21/31; G06F 21/602; G06F 21/6209; G06F 21/85; H04L 9/3247; H04L 9/3263
See application file for complete search history.

(56) References Cited

U.S. PATENT DOCUMENTS

| | | | |
|---|---|---|---|
| 5,857,022 A | 1/1999 | Sudia | |
| 6,453,416 B1 | 9/2002 | Epstein | |
| 7,587,600 B2 | 9/2009 | Bodensjo et al. | |
| 7,814,337 B2 * | 10/2010 | Lee .................. | G06F 21/79 |
| | | | 713/193 |
| 2004/0143710 A1 * | 7/2004 | Walmsley ........... | B41J 2/04508 |
| | | | 711/144 |

(Continued)

FOREIGN PATENT DOCUMENTS

WO        2000031644 A1       6/2000

OTHER PUBLICATIONS

Weiqi Dai, T.P.Parker, Hai Jin Enhancing Data Trustworthiness via Assured Digital Signing vol. 9, Issue: 6, Nov.-Dec. 2012 Aug. 6, 2012, pp. 833-851, Publisher: IEEE Abstract, section 5—p. 13.

*Primary Examiner* — Ali S Abyaneh
*Assistant Examiner* — Shu Chun Gao
(74) *Attorney, Agent, or Firm* — Joseph P. Aiena

(57) ABSTRACT

There is provided a safe data signer device and methods to organize a safe data signer device so that certificate located there is completely isolated from unwanted access. The user certificate cannot be copied from this device to any other computer device. The certificate can only be written on the safe data signer once, although in at a future point, this certificate can be rewritten by a new certificate. The method and device assures that the certificate cannot be used even if malicious parties get physical access to the device.

10 Claims, 8 Drawing Sheets

(56) References Cited

U.S. PATENT DOCUMENTS

| | | | |
|---|---|---|---|
| 2006/0095771 A1 | 5/2006 | Appenzeller et al. | |
| 2008/0022413 A1* | 1/2008 | Holtzman | G06F 21/6218 |
| | | | 726/27 |
| 2009/0193266 A1* | 7/2009 | Gable | G06F 21/805 |
| | | | 713/193 |
| 2010/0042848 A1 | 2/2010 | Rosener | |
| 2010/0138652 A1* | 6/2010 | Sela | H04L 9/3268 |
| | | | 713/158 |
| 2014/0164776 A1* | 6/2014 | Hook | G06F 21/6218 |
| | | | 713/171 |
| 2015/0326540 A1* | 11/2015 | Hamburg | H04L 63/062 |
| | | | 713/168 |
| 2016/0306966 A1* | 10/2016 | Srivastava | H04L 63/08 |
| 2016/0371213 A1* | 12/2016 | Voto | G06F 13/4022 |
| 2018/0019980 A1* | 1/2018 | Dempster | G06F 21/62 |

* cited by examiner

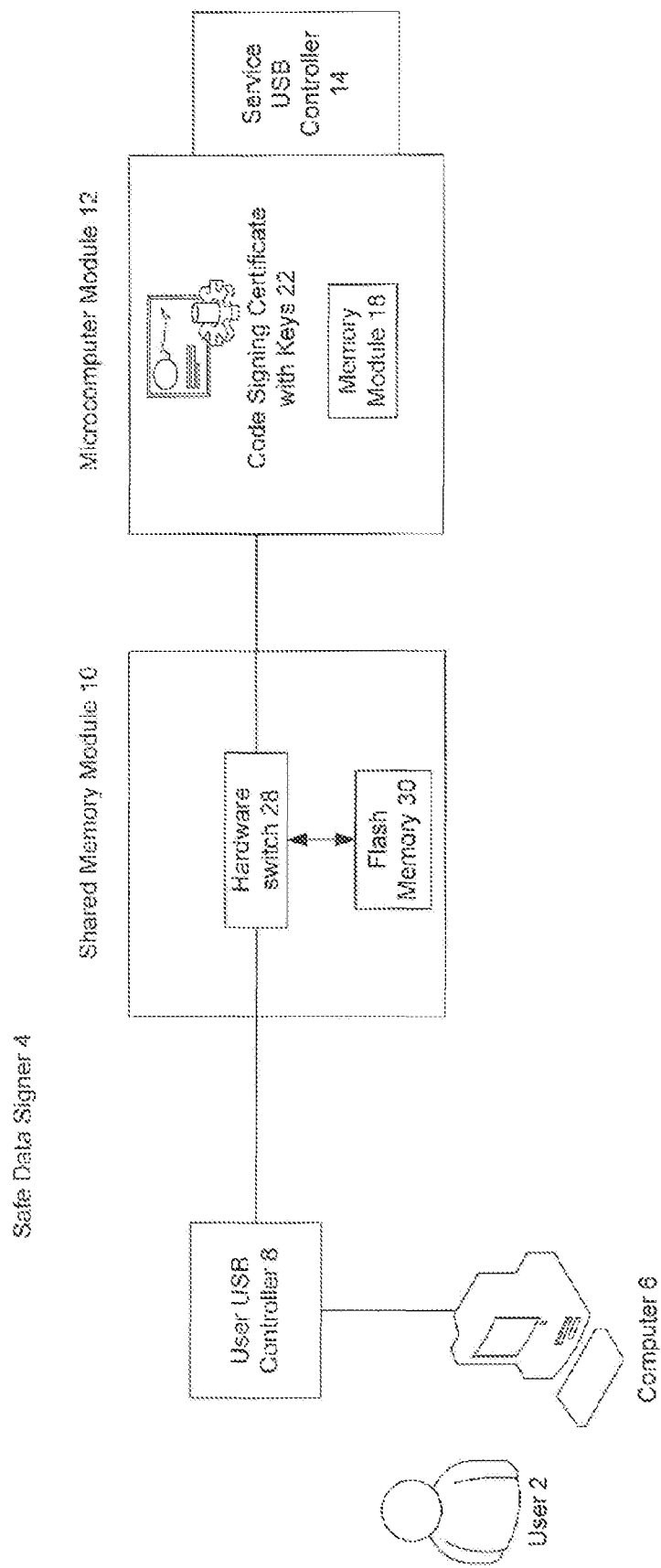

Isolated Memory Module for Certificate Storage

DEVICE FOR SAFE DATA SIGNING

CROSS REFERENCE TO RELATED APPLICATIONS

This application claims the benefit of and priority to U.S. provisional application Ser. No. 62/478,659, filed on Mar. 30, 2017 and incorporated herein by reference in its entirety.

BACKGROUND

In data signing it is very critical to protect private keys and certificates in all possible ways. If code signing private key or certificate is stolen, all data on the computer system or even in the network is compromised.

To control safety of certificates and keys organizations can apply several approaches. For example, separation of test signing and release signing. There will be used different certificates for signing officially released software and for signing test versions in everyday routine tasks, so it minimizes unwanted access to certificate of released software from malicious third parties. Another method to protect certificate is to store it on a separate cryptographic hardware module. And the main condition for keeping a certificate safe is to provide physical security when unnecessary access to keys and certificate is very limited. There can be used multi-factor authentication for access to the system and network, or there can be blocked all but the most necessary network ports, installed security updates, run an updated antivirus scanner, etc.

But all these measures have certain drawbacks. Many users ignore installation of security software updates or constantly postpone it. So even knowing about necessity to defend their computer they tend to pay attention to safety only after some malicious attack has already happened. Multi-level or multi-factor authentication really provides strong defense, but it is rather expensive and, in some cases, inconvenient. Hardware module guarantees isolation of certificate, but when it is connected to computer, certificate becomes vulnerable. The module can also be stolen by fraudsters and a certificate will be easily accessed.

Thus, there is needed a new method and device to protect digital certificates and keys that would be effective under all common conditions, easily implemented and provide cost savings/efficiency. Also, this new method should provide complete isolation of certificate or keys even if it is located on and connected to a computer module.

SUMMARY OF THE INVENTION

The current invention is a method, device, and system for simple and safe data signing that makes it physically impossible to steal a user certificate.

The safe data signer of the present invention is designed so that a user certificate cannot be copied from this device to any other computer device. That means that certificate can only be written on a safe data signer once, though at a point in the future this certificate can be rewritten by a new certificate. It guarantees that the certificate could not be used even if malicious parties get physical access to the device.

Also, safe data signer does not require special software to be installed on computer containing data for signing. But there is used software installed on safe data signer that implements all service operations necessary for device functioning.

Additionally, the safe data signer can be used as safe storage for any sensitive data. This data is moved to memory of microcomputer of safe data signer without signing and further the user can open an access for separate files if needed.

The present invention includes a method for safe data signing where a certificate is uploaded on a safe data signer and isolated from unwanted access. The method includes the steps of isolating a safe data signer from other components, where the safe data signer contains a user USB controller, a shared memory module, a microcomputer module and a service USB controller. The method uploads onto the safe data signer a certificate and transfers data for signing and supporting write/read operations between an external computer device and the shared memory module of the safe data signer by an external USB port with the user USB controller. Then, the method includes collecting data for signing, by the shared memory module and the shared memory module containing a hardware switch and flash memory which can be connected either to the external USB port and be available as USB flash drive, or to the microcomputer module and serve as external memory.

The method further includes wherein the safe data signer is not stand-alone and powered through the external USB port. In an embodiment, the method includes where the safe data signer is stand-alone and is powered through the external USB port. The safe data signer includes a built-in battery, and the built in battery is powered through the external USB port.

In the method, in an embodiment, the safe data signer is stand-alone, and the safe data signer uses a wireless connection and includes an embedded Wi-Fi™/BlueTooth® controller, a touch screen, or screen and keyboard. The safe data signer is capable of being managed through installed software that provide a user interface.

The method of the present invention also includes where the data is signed by the safe data signer and further includes the steps of connecting the safe data signer to a computer; writing the data to be signed to the safe data signer; inputting a password for certificate decoding; disconnecting the flash memory physically by the hardware switch if the password is valid. The method continues by connecting the flash memory of the shared memory module to the microcomputer module and recognizing by the microcomputer module the microcomputer device. Then, the method finds data, such as at least one file, by the microcomputer module and signing the at least one file with the uploaded certificate. The method transfers this data and or file to a "signed" folder or any other determined location 5 selected by the user. At this point, the microcomputer sends a command to the hardware switch that an operation is finished. The hardware switch then disconnects the flash memory from the microcomputer module and connecting to the controller of the external USB port. The method then detects (or re-detects) external media by the operating system of the computer where the safe data signer was plugged.

The method of the present invention includes wherein the certificate/keys are downloaded or changed, comprising the steps of selecting in a menu option to download certificate/keys to the safe data signer and then the method continues by switching flash memory of the safe data signer to the external USB port. The method includes switching, by the flash memory, to the microcomputer module after the certificate/key(s) is uploaded to the flash memory. The method then sends the certificate/key(s) to the certificate memory module of the microcomputer module. The microcomputer module then sends a request to input a password if the certificate has password protection. After password input, the method and device of the invention erases the previous certificate and downloads a new certificate to the certificate memory module if the password is valid after input. Otherwise, if the password is not valid after input, the method and device of the present invention rejects and deletes the new certificate. The method and device then encrypts the new certificate with a new password.

The present invention includes a system and device for safe data signing which is isolated from unwanted access. The system and device comprise a user USB controller, a shared memory module, a microcomputer module and a service USB controller, with each of the elements isolated from each other. A certificate/key is uploaded to the microcomputer module. An external port with the user USB controller transfers data for signing and supports write/read operations between an external computer device and the shared memory module of the safe data signer. The shared memory module collects data for signing and containing a hardware switch and flash memory that is connected either to the external USB port and is available as USB flash drive or to the microcomputer module and serves as external memory. Physically isolated from an external interface, the microcomputer module contains the microcomputer device and separate memory modules with an operating system and user certificate. Isolation of devices may include electronic isolation, as well as physical. The service USB controller is hidden in a chassis of the microcomputer module and working in write-only mode. The service USB controller is used for software updating or downloading a new user certificate.

The device of the present invention includes where the device for safe data signing is not stand-alone and powered through the external USB port. Further, in an embodiment, the device of the present invention is a device for safe data signing and is stand-alone and is powered through the external USB port. The device for safe data signing includes a built-in battery, with the built in battery powered through the external USB port.

The device of the present invention includes where the device for safe data signing is stand-alone, and the device for safe data signing uses a wireless connection and includes an embedded Wi-Fi™/BlueTooth® controller, a touch screen, or screen and keyboard; said device for safe data signing is managed through installed software providing a user interface.

BRIEF DESCRIPTION OF DRAWINGS

FIG. 1A is a depiction of the present invention where protected service USB port mode is present.

DETAILED DESCRIPTION

The present invention discloses method to organize safe data signer device so that certificate there would be completely isolated from unwanted access.

Figure 1B:
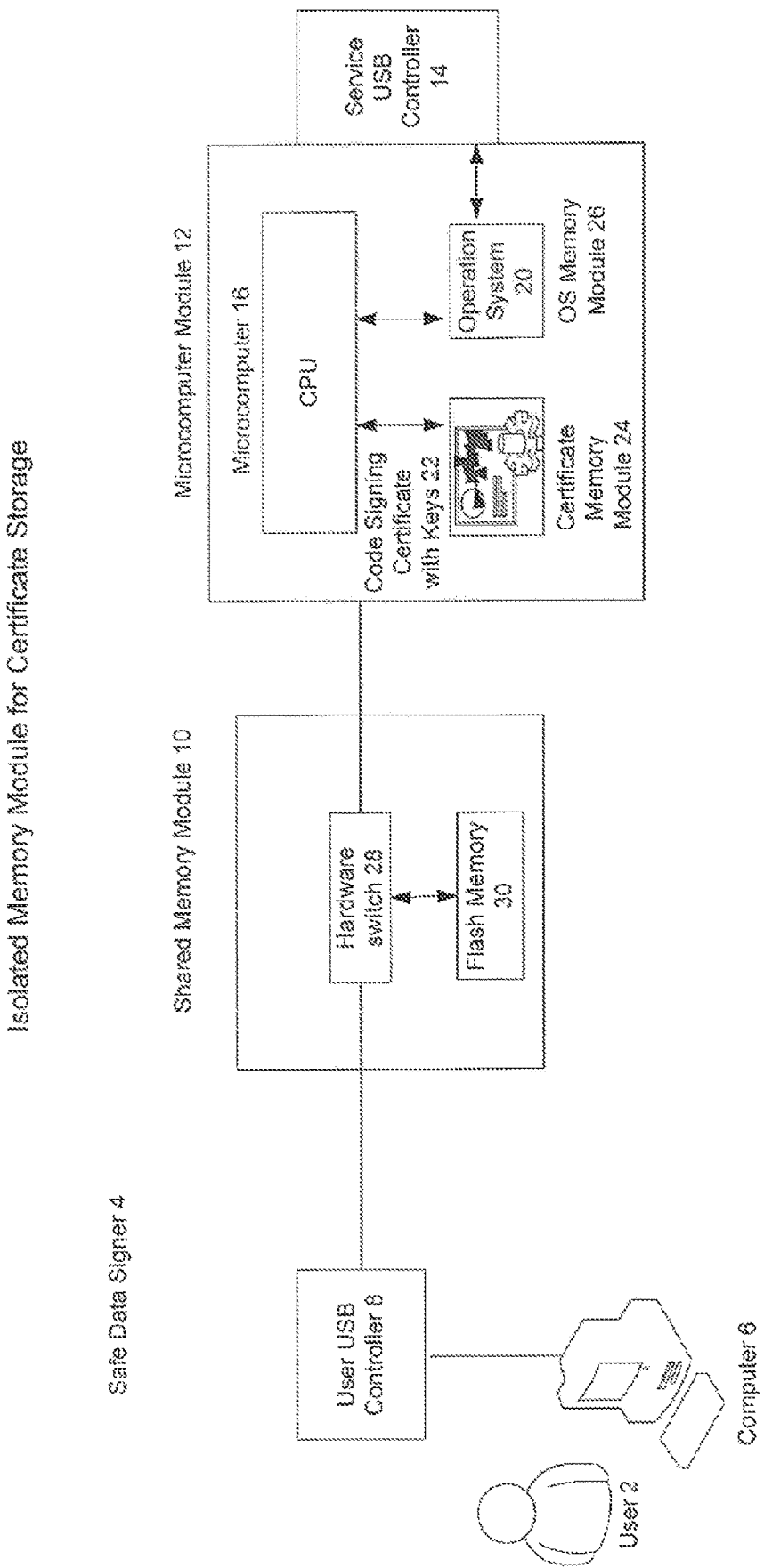
FIG. 1B is a depiction of the present invention where an isolated memory module for certificate storage is included.

FIGS. IA and IB show depiction of the scheme of the present invention. There is a user 2 that plugs in a safe data signer device 4 into USB port of computer 6. The safe data signer 4 contains sex eral isolated from each other components. These are user USB controller 8, shared memory module 10, microcomputer module 12 and service USB controller 14. Microcomputer module 10 includes microcomputer device 16 and memory module 18 which comprises operating system 20 and user certificate 22 with key pair. Data is recorded through special wired interface (for example. USB). Microcomputer module 10 is physically isolated from external interface. it is impossible to connect to it or affect it. There is a service USB controller 14 of microcomputer module 12 that is hidden in device chassis and that is used for software updating or downloading new user certificate. This service USB controller 14 works in write-only mode, as it is shown in FIG. 1A. and so data from microcomputer 16 can not be read and therefore stolen. Also, user certificate 22 and operation operating system 20 can be stored on microcomputer module 12 in separate memory modules, as it is shown in FIG. 1 B. Certificate memory module 24 where certificate 22 is located will be fully isolated and can not be accessed even through service USB controller 14. Though operating system memory module 26 can be accessed through service USB controller 14 for updating operating system 20 and writing data. but it will not have direct connection to certificate memory module 24. There is an external port with user USB controller 8 that is used for transfer data for signing. It supports write/read operations between external computer device 6 and shared memory module 10 of safe data signer 4. There is a shared memory module 10 that would collect data for signing. It comprises hardware switch 28 and flash memory 30. Shared memory module 10 will be connected both to external port 8 and microcomputer module 12, and flash memory 30 is connected either to external USB port 8 and be available as USB flash drive or to microcomputer module 12 and serve as external memory.

Figure 2A:
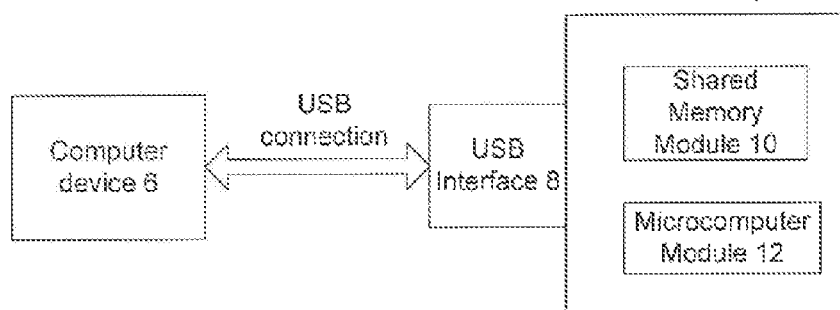
FIG. 2A is a depiction of an embodiment of the safe data signer device modelling.
Figure 2B:
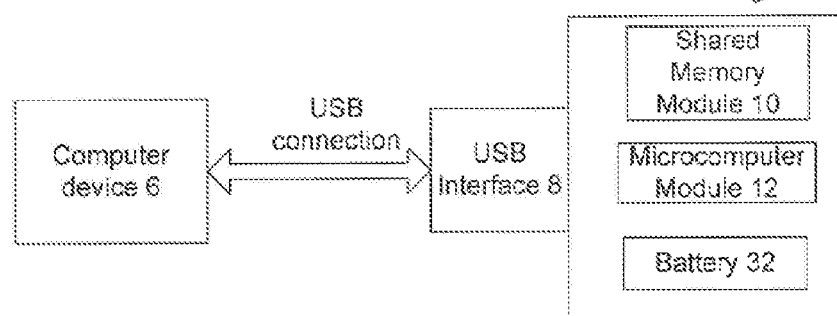
FIG. 2B is a depiction of an embodiment of the safe data signer device modelling.
Figure 2C:
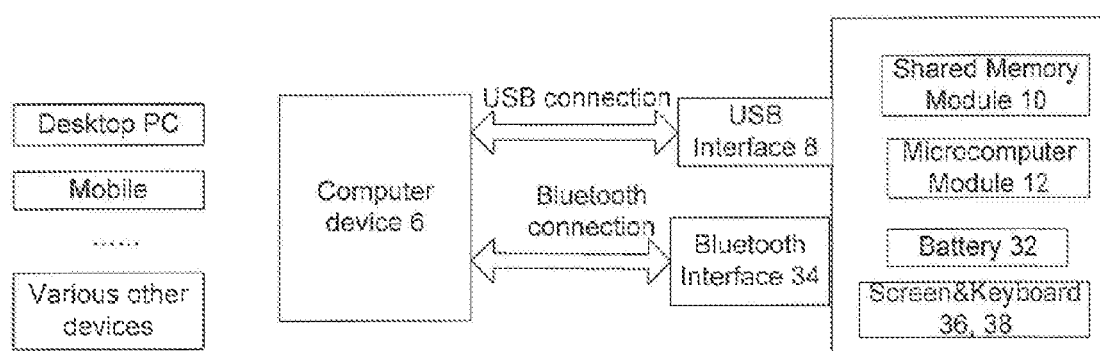
FIG. 2C is a depiction of an embodiment of the safe data signer device modelling.

FIGS. 2A, 2B, 2C show depiction of embodiments of safe data signer device modelling. FIG. 2A demonstrates basic embodiment the safe data signer 4 where safe data signer 4 is not stand-alone and powered through external USB port. It will look like USB flash drive. FIG. 2B demonstrates the second variant of safe data signer modelling where the safe data signer 4 is stand-alone and is powered through external USB port, but has built-in battery 32 (also powered through external USB port). Thus it is possible not to waste time for operating system loading. It will look like USB flash drive also. FIG. 2C demonstrates the third variant the safe data signer modelling where it is stand-alone and uses wireless connection. Besides USB port device may have embedded Wi-Fi™/BlueTooth® controller 34. That is data can be transmitted and received by devices through wireless connection. In this case the safe data signer 4 will look like cell phone. It will have touch screen 36 or screen and keyboard 38. There will be installed software 40 that would provide user interface to manage safe data signer functioning. Among others software will support the following operations: downloading keys/certificate, signing data, authorizing access to device and certificate (setting password for access to device, setting password to certificate itself, changing passwords), denying access or erasing data (certificate) if the password is incorrect and the number of tries to enter incorrect password is more than five. Thus, having additional password protection safe data signer 4 is staying.

Figure 3:
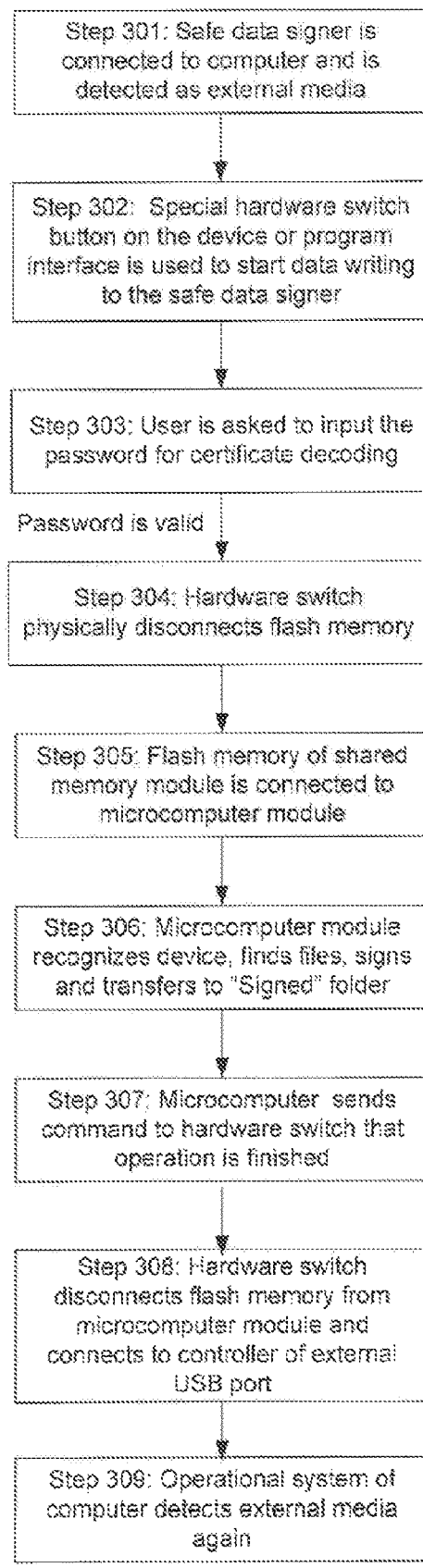
FIG. 3 is a flowchart of the invention where data is signed by the safe data signer device.

FIG. 3 is a flowchart of the invention where data is signed by safe data signer 4. In step 301, safe data signer 4 is connected to computer 6 and is detected as external media. In step 302, the data that is to be signed is written to the safe data signer 4. There will be used special hardware switch button on the device or program interface to activate the data signing operation. In step 303 user 2 will be asked to input the password for certificate decoding. In step 304, if password is valid, hardware switch 28 will physically disconnect flash memory 30. Then, in step 305, flash memory of shared memory module 10 is connected to microcomputer module 12. In step 306, microcomputer module 12 recognizes device, finds files, signs it with pre-loaded certificate 22 and transfers to "Signed" folder or any other location determined by user 2. In step 307, microcomputer 16 sends command to hardware switch 28 that operation is finished and, in step 308, hardware switch 28 disconnects flash memory 30 from microcomputer module 12 and connects to controller of external USB port. In step 309, operating system of computer 6 where the safe data signer 4 was plugged in detects external media again.

Figure 4:
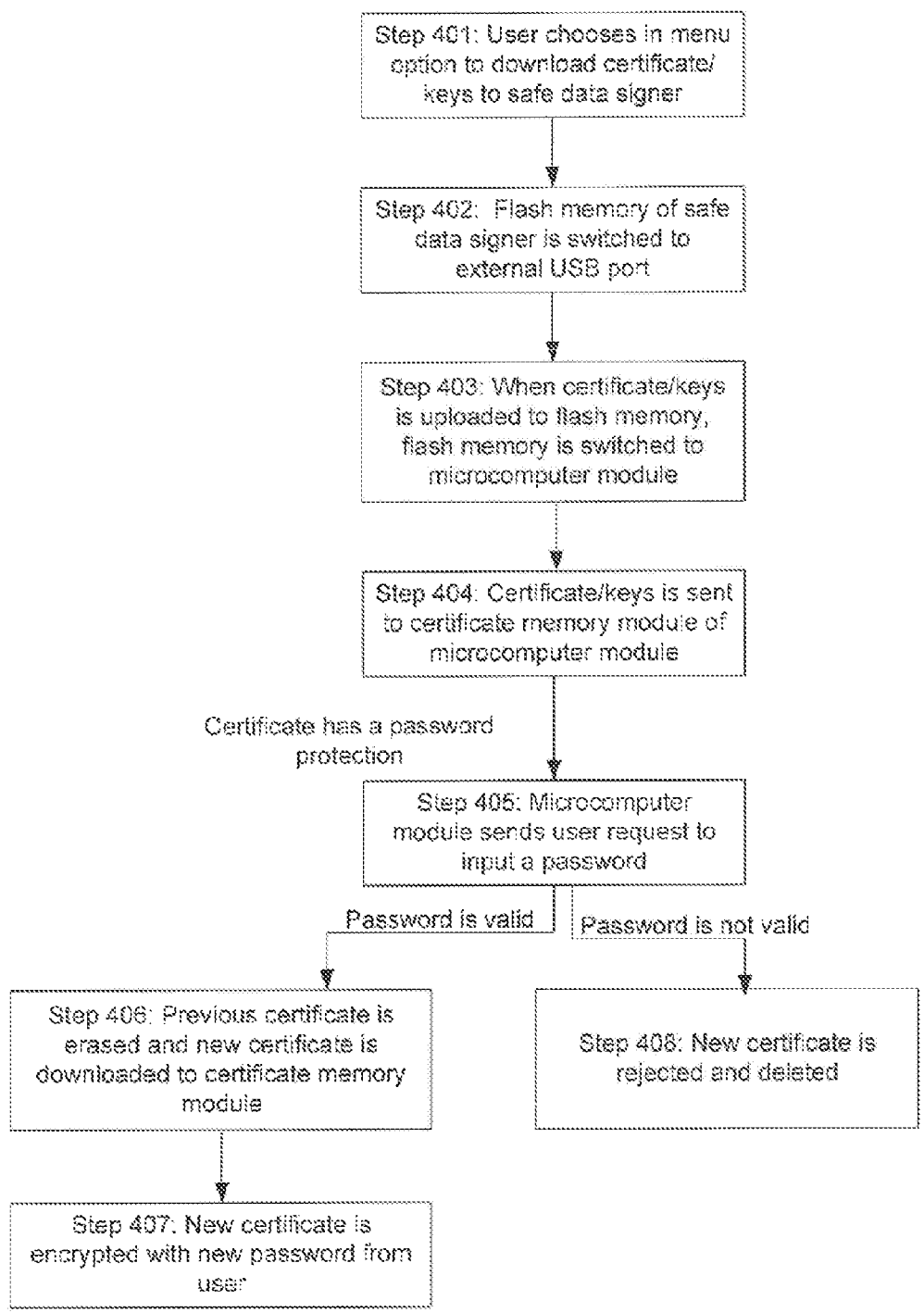
FIG. 4 is a flowchart of the invention where a certificate is downloaded or changed.

FIG. 4 is a flowchart of the invention where certificate 22 is downloaded or changed. In step 401, user 2 chooses in menu option to download certificate/keys 22 to safe data signer 4. In step 402, flash memory 30 of safe data signer 4 is switched to external USB port. When certificate/keys 22 is uploaded to flash memory 30, flash memory 30 is switched to microcomputer module 12, step 403. In step 404, certificate/keys 22 is sent to certificate memory module 24 of microcomputer module 12. In step 405, if certificate 22 has a password protection the microcomputer module 12 sends user 2 requests to input a password. In step 406, if password is valid previous certificate is erased and new certificate is downloaded to certificate memory module 24. In step 407, new certificate is encrypted with new password from user 2. In step 408, if password is not valid, new certificate is rejected and deleted.

Figure 5:
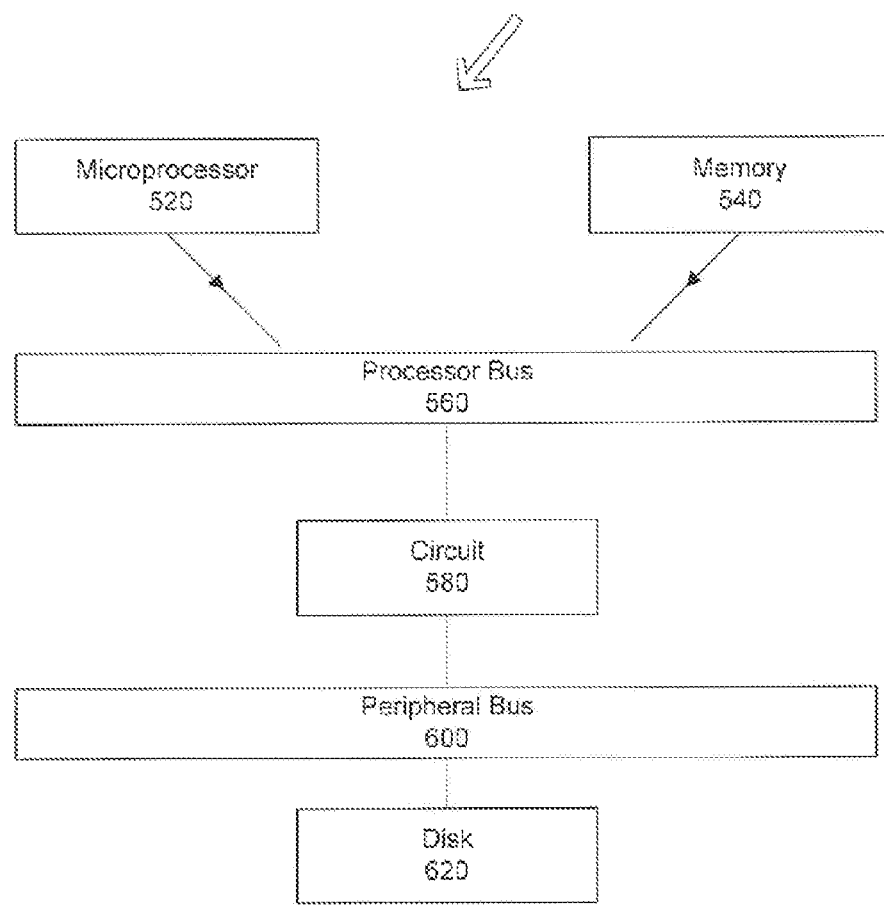
FIG. 5 is a schematic of the memory and hardware of a computer or handheld device.
Figure 6:
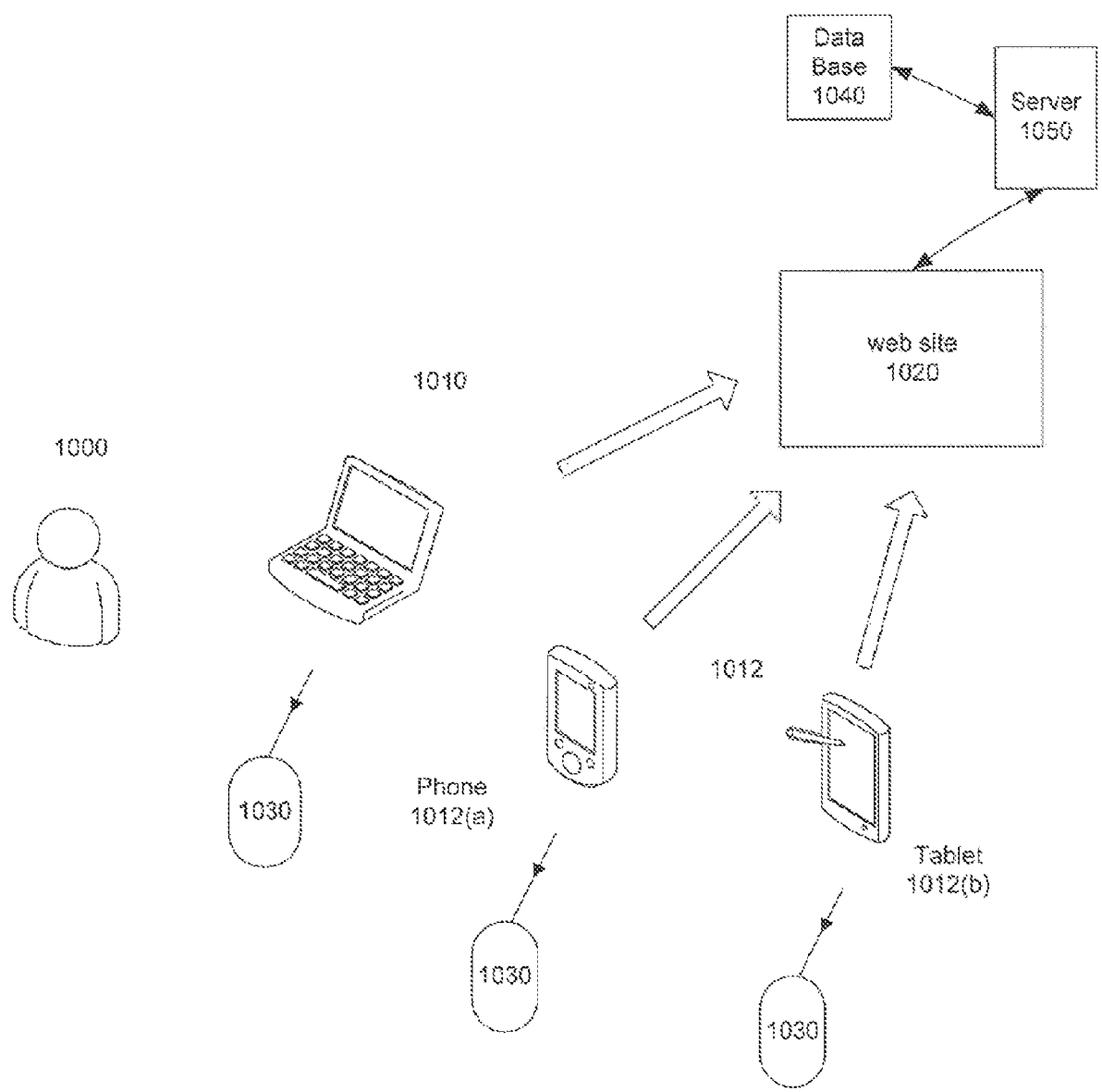
FIG. 6 is a schematic of an individual user operating a computer or handheld device connected to the internet.
Figure 7:
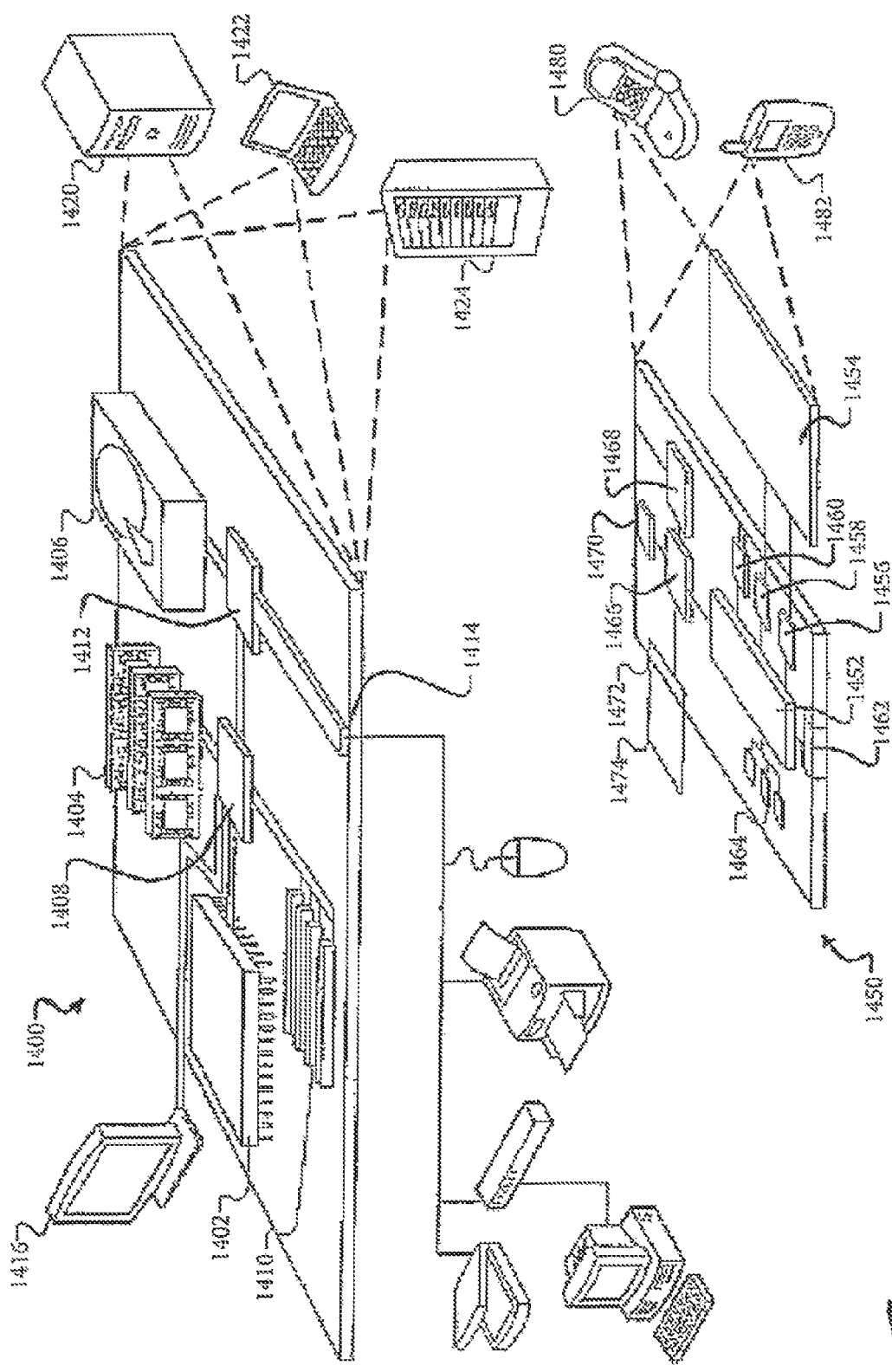
FIG. 7 shows an example of a computer device and a mobile computer device which may be used to implement the processes described herein.

The system and method of the present invention may be used with exemplary computer systems and devices as shown in FIGS. 5, 6, and 7. FIG. 5 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 6, there is a user 1000 of a computer 1010 or handheld device 1012 who accesses an Internet website 1020 with network connections to a server 1050 and database 1040. The computer 1010 or handheld device is compatible with operating systems known in the art, such as Windows, iOS or android devices or android type operating systems. The user 1000 is potentially exposed to many malicious or unsafe applications located on the web or a particular website 1020 due to lack of security and validation with the source, even though the website 1020 itself may be known as reliable and trusted. The website may be an application store or directory which includes other software applications for downloading. Similarly, receiving email may introduce unsafe internet links, applications and attachments to the user's computer or device. Those of skill in the art would recognize that the computer 1010 or hand held devices 1012a or 1012b each has a processor and a memory coupled with the processor where the memory is configured to provide the processor with executable instructions. A boot disk 1030 is present for initiating an operating system as well for each of the computer 1010 or hand held devices 1012. It should also be noted that as used herein, the term handheld device includes phones, smart phones, tablets, personal digital assistants, media and game players and the like. It should also be understood that the user's computer or device may be part of an internal network or system which is communicating with the Internet. As used throughout the specifications, the term "query" or "queries" is used in the broadest manner to include requests, polls, calls, summons, queries, and like terms known to those of skill in the art.

FIG. 7 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a Microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single in Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short range communication may occur, such as using a BlueTooth®, Wi-Fi™, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware, and may be construed as implicitly including Digital Signal Processor (DSP) hardware.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for safe data signing where a certificate is uploaded on safe data signer and isolated from unwanted access comprising:
   isolating a safe data signer from other components, said safe data signer containing components isolated from each other, said components are:
   a user USB controller, a shared memory module containing a hardware switch and flash memory, a microcomputer module and a service USB controller;

said service USB controller hidden in a chassis of said microcomputer module and working in write-only mode;

said microcomputer module having a microcomputer device, a certificate memory module, a code signing certificate with key pair and an operating system memory module;

uploading onto said safe data signer a certificate;

transferring data for signing and supporting write and or read operations between an external computer device and said shared memory module of said safe data signer by an external port with said user USB controller;

collecting data for signing, by said shared memory module and said shared memory module connect either to said user USB controller and available as USB flash drive, or to said microcomputer module and serve as external memory.

2. The method according to claim 1, wherein said safe data signer is not stand-alone and powered through said user USB controller.

3. The method according to claim 1, wherein said safe data signer is stand-alone and is powered through said user USB controller; said safe data signer includes a built-in battery, said built in battery powered through said user USB controller.

4. The method according to claim 1, wherein said safe data signer is stand-alone, and said safe data signer uses a wireless connection and includes an embedded short range communication controller, a touch screen, or screen and keyboard;

said safe data signer managed through installed software providing a user interface.

5. The method according to claim 1, where said data is signed by said safe data signer comprising the steps of:

connecting said safe data signer to a computer;

writing the data to be signed to the safe data signer;

inputting a password for certificate decoding;

disconnecting said flash memory physically by said hardware switch if said password is valid;

connecting said flash memory of said shared memory module to said microcomputer module;

recognizing by said microcomputer module said microcomputer device, finding at least one file by said microcomputer module, signing said at least one file with said uploaded certificate and transferring to a folder or any other determined location;

sending, by said microcomputer, a command to said hardware switch that an operation is finished;

disconnecting, by said hardware switch, said flash memory from said microcomputer module and connecting to controller of said user USB controller; and detecting external media by said operating system of said computer where said safe data signer was plugged in.

6. The method according to claim 1, wherein said certificate with key pair are downloaded or changed comprising:

selecting in menu option to download certificate with key pair to safe data signer;

switching flash memory of said safe data signer to said user USB controller;

switching, by said flash memory, to said microcomputer module after certificate with key pair is uploaded to said flash memory;

sending certificate with key pair to certificate memory module of said microcomputer module;

sending a request, by said microcomputer module, to input a password if said certificate has password protection;

erasing previous certificate and downloading a new certificate to said certificate memory module if said password is valid after input;

rejecting and deleting said new certificate if said password is not valid after input;

encrypting said new certificate with a new password.

7. A device for safe data signing which is isolated from unwanted access comprising:

said device having as components a user USB controller, a shared memory module containing a hardware switch and flash memory, a microcomputer module and a service USB controller, each of said components isolated from each other;

a certificate uploaded to said microcomputer module;

an external port with said user USB controller transferring data for signing and supporting write and or read operations between an external computer device and said shared memory module of said safe data signer;

said shared memory module collecting data for signing and connect either to said user USB controller and available as USB flash drive or to said microcomputer module for service as external memory;

physically isolated from external interface, said microcomputer module containing said microcomputer device and a pair of separate memory modules, an operating system memory module and a user certificate memory module, associated with operating system and user certificate, respectively; and said service USB controller hidden in a chassis of said microcomputer module and working in write-only mode, said service USB controller is used for software updating or downloading new user certificate.

8. The device according to claim 7, wherein said device for safe data signing is not stand-alone and powered through said user USB controller.

9. The device according to claim 7, wherein said device for safe data signing is stand-alone and is powered through said user USB controller; said device for safe data signing includes a built-in battery, said built in battery powered through said user USB controller.

10. The device according to claim 7, wherein said device for safe data signing is stand-alone, and said device for safe data signing uses a wireless connection and includes an embedded short range communication controller, a touch screen, or screen and keyboard;

said device for safe data signing is managed through installed software providing a user interface.

\* \* \* \* \*